US007713893B2

(12) United States Patent
Goering

(10) Patent No.: US 7,713,893 B2
(45) Date of Patent: May 11, 2010

(54) THREE-DIMENSIONAL WOVEN INTEGRALLY STIFFENED PANEL

(75) Inventor: Jonathan Goering, York, ME (US)

(73) Assignee: Albany Engineered Composites, Inc., Rochester, NH (US)

(*) Notice: Subject to any disclaimer, the term of this patent is extended or adjusted under 35 U.S.C. 154(b) by 550 days.

(21) Appl. No.: 11/007,600

(22) Filed: Dec. 8, 2004

(65) Prior Publication Data
US 2006/0121809 A1    Jun. 8, 2006

(51) Int. Cl.
*D03D 11/00* (2006.01)
*D03D 13/00* (2006.01)
*B32B 5/26* (2006.01)
*B32B 27/04* (2006.01)
*B32B 27/38* (2006.01)

(52) U.S. Cl. .................. 442/246; 442/205; 442/203; 442/251; 442/253; 442/254; 139/11; 139/DIG. 1; 139/384 R

(58) Field of Classification Search ......... 442/203–220; 428/176, 177, 179, 181, 182, 183, 184, 185, 428/186
See application file for complete search history.

(56) References Cited

U.S. PATENT DOCUMENTS

| | | | |
|---|---|---|---|
| 4,256,790 A | 3/1981 | Lackman et al. | |
| 4,331,349 A | 5/1982 | Funahashi | |
| 4,331,495 A | 5/1982 | Lackman et al. | |
| 4,922,968 A | 5/1990 | Bottger et al. | |
| 5,085,252 A * | 2/1992 | Mohamed et al. | 139/22 |
| 5,429,853 A | 7/1995 | Darrieux | |
| 5,772,821 A | 6/1998 | Yasui et al. | |
| 5,783,279 A | 7/1998 | Edgson et al. | |
| 5,785,094 A | 7/1998 | Yoshida | |
| 5,899,241 A | 5/1999 | David et al. | |
| 6,010,652 A | 1/2000 | Yoshida | |
| 6,019,138 A | 2/2000 | Malek et al. | |
| 6,103,337 A | 8/2000 | Burgess | |
| 6,283,168 B1 | 9/2001 | Gu et al. | |
| 6,374,570 B1 | 4/2002 | McKague, Jr. | |
| 6,418,973 B1 | 7/2002 | Cox et al. | |
| 6,446,675 B1 | 9/2002 | Goering | |
| 6,520,706 B1 | 2/2003 | McKague, Jr. et al. | |
| 6,589,472 B1 | 7/2003 | Benson et al. | |
| 6,676,882 B2 | 1/2004 | Benson et al. | |
| 6,712,099 B2 | 3/2004 | Schmidt et al. | |
| 6,718,713 B2 | 4/2004 | McKague, Jr. et al. | |
| 6,733,211 B1 | 5/2004 | Durie | |

(Continued)

FOREIGN PATENT DOCUMENTS

WO    WO 02/16197 A    2/2002

(Continued)

*Primary Examiner*—Jennifer A Chriss
(74) *Attorney, Agent, or Firm*—Frommer Lawrence & Haug LLP; Ronald R. Santucci

(57) ABSTRACT

An integrally woven three-dimensional preform with stiffeners in two directions constructed from a woven base fabric having first, second and third woven fabrics. A plurality of yarns are interwoven over a region between the first and second fabrics such that the first fabric is foldable relative to the second fabric. An additional plurality of yarns are interwoven over a region between the second and third fabrics such that the third fabric is foldable relative to the second fabric. Upon folding of the woven base fabric, the integrally woven three-dimensional preform with stiffeners in two directions is formed.

60 Claims, 17 Drawing Sheets

U.S. PATENT DOCUMENTS

| | | |
|---|---|---|
| 6,733,862 B2 | 5/2004 | Goering |
| 6,821,368 B2 | 11/2004 | Benson et al. |
| 6,835,261 B2 | 12/2004 | Schmidt |
| 6,874,543 B2 | 4/2005 | Schmidt et al. |
| 6,913,045 B2 | 7/2005 | Fantino et al. |
| 7,014,805 B1 | 3/2006 | Reis et al. |
| 7,077,167 B2 | 7/2006 | Nayfeh et al. |
| 7,244,487 B2 | 7/2007 | Brantley et al. |
| 2002/0090874 A1 | 7/2002 | McKague, Jr. et al. |
| 2003/0041948 A1 | 3/2003 | Bersuch et al. |
| 2003/0056847 A1 | 3/2003 | Schmidt et al. |
| 2003/0116267 A1 | 6/2003 | Sheahen et al. |
| 2004/0023581 A1 | 2/2004 | Bersuch et al. |

FOREIGN PATENT DOCUMENTS

| | | |
|---|---|---|
| WO | WO 02/066235 A | 8/2002 |

* cited by examiner

THREE-DIMENSIONAL WOVEN INTEGRALLY STIFFENED PANEL

BACKGROUND OF THE INVENTION

1. Field of the Invention

The present invention relates to integrally woven preforms for reinforced composite structures which can be woven flat and folded into their final three-dimensional shape, the final shape having reinforcement in two or more directions.

2. Background of the Invention

The use of reinforced composite materials to produce structural components is now widespread, particularly in applications where their desirable characteristics for being lightweight, strong, tough, thermally resistant, self-supporting and adaptability to being formed and shaped are sought. Such components are used, for example, in the aeronautical, aerospace, satellite, and fuel cell industries, as well as for recreational uses such as in racing boats and autos, as well as countless other applications. A three-dimensional fabric generally consists of fibers extending along a direction in the X, Y and Z directions.

Typically components formed from such fabrics consist of reinforcement materials embedded in matrix materials. The reinforcement component may be made from materials such as glass, carbon, ceramic, aramid (e.g., "KEVLAR"), polyethylene, and/or other materials which exhibit desired physical, thermal, chemical and/or other properties, chief among which is great strength against stress failure. Through the use of such reinforcement materials, which ultimately become a constituent element of the completed component, the desired characteristics of the reinforcement materials such as very high strength, are imparted to the completed composite component. The constituent reinforcement materials may typically be woven, knitted or otherwise oriented into desired configurations and shapes for reinforcement preforms. Usually, particular attention is paid to ensure the optimum utilization of the properties for which these constituent reinforcing materials have been selected. Generally, such reinforcement preforms are combined with matrix material to form desired finished components or produce working stock for the ultimate production of finished components.

After a desired reinforcement preform has been constructed, matrix material may be introduced and combined with the preform, so that the reinforcement preform becomes encased in the matrix material such that the matrix material fills the interstitial areas between the constituent elements of the reinforcement preform. The matrix material may be any of a wide variety of materials, such as epoxy, polyester, vinylester, ceramic, carbon and/or other materials, which also exhibit desired physical, thermal, chemical and/or other properties. The materials chosen for use as the matrix may or may not be the same as that of the reinforcement preform and may or may not have comparable physical, chemical thermal or other properties. Typically, however, they will not be of the same materials or have comparable physical, chemical, thermal or other properties, as the reinforcement preform, since a usual objective sought in using composites in the first place is to achieve a combination of characteristics in the finished product that is not attainable through the use of one constituent material alone. When combined, the reinforcement preform and the matrix material may then be cured and stabilized in the same operation by thermosetting or other known methods, and then subjected to other operations toward producing the desired component. It is significant to note that after being so cured, the then solidified masses of the matrix material are normally very strongly adhered to the reinforcing material (e.g., the reinforcement preform). As a result, stress on the finished component, particularly via its matrix material acting as an adhesive between fibers, may be effectively transferred to and borne by the constituent material of the reinforcing reinforcement preform.

Frequently, it is desirable to produce components in configurations other than simple geometric shapes such as plates, sheets, rectangular or square solids, etc. For instance, complex three-dimensional components require complex three dimensional preforms. One way to achieve a complex component is to combine basic geometric shapes into the desired more complex forms. One such typical combination is made by joining components made as described above at an angle (typically a right-angle) relative to each other to form lateral and transverse stiffeners. Usual purposes for such angular arrangements of joined components are to create desired shapes to form reinforced structures that include one or more end walls or "T" intersections for example. Another purpose for joining components is to strengthen the resulting combination of reinforcement preforms and the composite structure which it produces against deflection or failure when exposed to exterior forces such as pressure or tension. Therefore, it is important to make each juncture between the constituent components, i.e. the stiffener and the base platform or panel portion, as strong as possible. Given the desired very high strength of the reinforcement preform constituents per se, weakness of the juncture becomes, effectively, a "weak link" in a structural "chain."

Various methods have been used in the past for joining composite components or reinforcement preforms to produce a reinforced complex structure. It has been proposed to form and cure a panel element and an angled stiffening element separate from each other, with the latter having a single panel contact surface or being bifurcated at one end to form two divergent, co-planar panel contact surfaces. The two components are then joined by bonding the panel contact surface(s) of the stiffening element to a contact surface of the other component by thermosetting or by an adhesive material. However, when tension is applied to the cured panel or the skin of the composite structure, loads at unacceptably low values can result in "peel" forces which separated the stiffening element from the panel at their interface. This occurs because the effective strength of the joint is that of the matrix material and not of the adhesive used to bond the components.

The use of metal bolts or rivets at the interface of such components has also been used but is unacceptable because such additions at least partially destroy and weaken the integrity of composite structures themselves, add weight, and introduce differences in the coefficient of thermal expansion as between such elements and the surrounding material. In addition, bolts and rivets require additional manufacturing steps and increase part counts.

Other approaches to solving this problem have been based on the concept of introducing high strength fibers across the joint area through the use of such methods as stitching one of the components to the other and relying upon the stitching thread to introduce such strengthening fibers into and across the juncture site. One such approach is shown in U.S. Pat. No. 4,331,495 and its method divisional counterpart, U.S. Pat. No. 4,256,790. These patents disclose junctures having been made between a first and second composite panels made from adhesively bonded fiber plies. The first panel is bifurcated at one end to form two divergent, co-planar panel contact surfaces in the prior art manner, that have been joined to the second panel by stitches of uncured flexible composite thread through both panels. The panels and thread are then "co-cured": i.e., cured simultaneously. However, this process requires the preform to be constructed in multiple steps as well as requires the introduction of a third yarn or fiber into the preform. Stitching can also produce damage in the preform that will degrade in-plane performance.

An example of an intersecting configuration is set forth in U.S. Pat. No. 6,103,337, the disclosure of which is incorporated herein by reference. This reference discloses a means for joining a reinforcement preform with a preform panel to form a three-dimensional reinforcement preform. The two individual preforms are joined to each other at the junction by means of reinforcing fibers in the form of threads or yarns. Once the two preforms are joined or stitched together, matrix material is introduced to the preforms. While this process and product has proven to be very satisfactory, it requires that the preforms be individually woven or constructed and subsequently stitched together in a separate step.

Another method to improve upon junction strength is set forth in U.S. Pat. No. 5,429,853. However, this method is similar to previously described methods because separately constructed distinct elements are joined together by the stitching of a third yarn or fiber between the two.

While the prior art has sought to improve upon the structural integrity of the reinforced composite and has achieved some success, there exists a desire to improve thereon and to address the problem through an approach different from the use of adhesives or mechanical coupling of the separate panel and stiffener elements. In this regard, one approach might be by creating a woven three-dimensional structure on specialized machines. However, the expense involved is considerable and rarely is it desirable to have a weaving machine directed to creating a simple structure.

Another approach is to weave a two-dimensional structure and fold it into shape so that the panel is integrally stiffened, i.e. yarns are continuously interwoven between the planar base or panel portion and the stiffener. However, this typically results in distortion of the preform when the preform is folded. The distortion occurs because the lengths of fiber as-woven are different than what they should be when the preform is folded. This causes dimples and ripples in areas where the as-woven fiber lengths are too short, and buckles in the areas where fiber lengths are too long. These distortions cause undesirable surface anomalies and reduce the strength and stiffness of the component. While this may be relieved by cutting and darting, such procedures are undesirable since they are labor intensive or otherwise may compromise the integrity of the preform.

U.S. Pat. No. 6,446,675, the disclosure of which is incorporated herein by reference, solves the problem with distortion that occurs upon folding a two-dimensional woven preform by adjusting the lengths of the fibers during weaving such that some fibers are too short in some areas and others too long in other areas. Upon folding the preform, the lengths of the fibers are equalized, providing for a smooth transition at the fold.

Another approach for constructing stiffened panels is set forth in U.S. Pat. No. 6,019,138 which discloses a method for making stiffened panels with reinforcing stiffeners in both the warp and fill directions. As disclosed, this method achieves reinforcement in two directions through over weaving, or simply weaving high spots into the panel portion of the preform. Using this method will limit the height of the stiffener that can be achieved. Further, this method requires that the preform be woven using three yarns. The third yarn, which binds the stiffener to the panel portion of the preform, is only periodically woven between the two. Therefore, the stiffener is not completely integrally woven with the panel portion which results in a joint that is weaker than a fully integrally woven joint.

Thus, three-dimensional preforms which can be processed into fiber reinforced composite components are desirable because they provide increased strength relative to two-dimensional laminated composites. These preforms are particularly useful in applications that require the composite to carry out-of-plane loads.

Accordingly, a need exists for an integrally woven preform that provides reinforcement in two or more directions that can be woven in one process using a conventional loom without any special modifications.

SUMMARY OF THE INVENTION

In accordance with the present invention, an integrally woven three-dimensional preform with stiffeners provided in two directions, constructed from a woven base fabric comprising a first woven fabric, a second woven fabric and a third woven fabric is provided. The base fabric contains a region with a plurality of yarns interwoven between the first and second fabrics such that the first fabric is foldable relative to the second fabric. The base fabric also contains a region with a plurality of yarns interwoven between the second and third fabrics such that the third fabric is foldable relative to the second fabric.

Another aspect of the present invention is an integrally woven three-dimensional preform comprising three or more fabrics with a stiffener in a first direction constructed from a foldable first fabric with a plurality of yarns interwoven between the first and the second fabrics. A second stiffener, in angular relation to the first stiffener, is constructed from a portion of a second foldable fabric and a portion of a third foldable fabric where a plurality of yarns are interwoven between the second and third fabrics.

A further aspect of the present invention is a method for forming an integrally woven three-dimensional preform. The method includes providing three or more woven fabrics and interweaving a plurality of yarns from the first fabric with a plurality of yarns from the second fabric such that the first fabric is foldable relative to the second fabric. The method also includes interweaving a plurality of yarns from the second fabric with a plurality of yarns from the third fabric such that the third fabric is foldable relative to the second fabric. Once interweaving is completed, the first fabric is cut to the top surface of the second fabric. The two first portions of the first fabric on either side of the interwoven regions of the first and second fabrics are then folded to form a stiffener in a first direction. A second portion of the folded first fabric is folded to form reinforcing members for a stiffener in a second direction. A first portion of the second and third fabrics are then folded to form a stiffener in a second direction. To finish the preform, a second portion of the third fabric is folded to complete the panel portion of the preform.

The various features of novelty which characterize the invention are pointed out in particularity in the claims annexed to and forming a part of this disclosure. For a better understanding of the invention, its operating advantages and specific objects attained by its uses, reference is made to the accompanying descriptive matter in which preferred embodiments of the invention are illustrated in the accompanying

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENTS

Figure 1A:
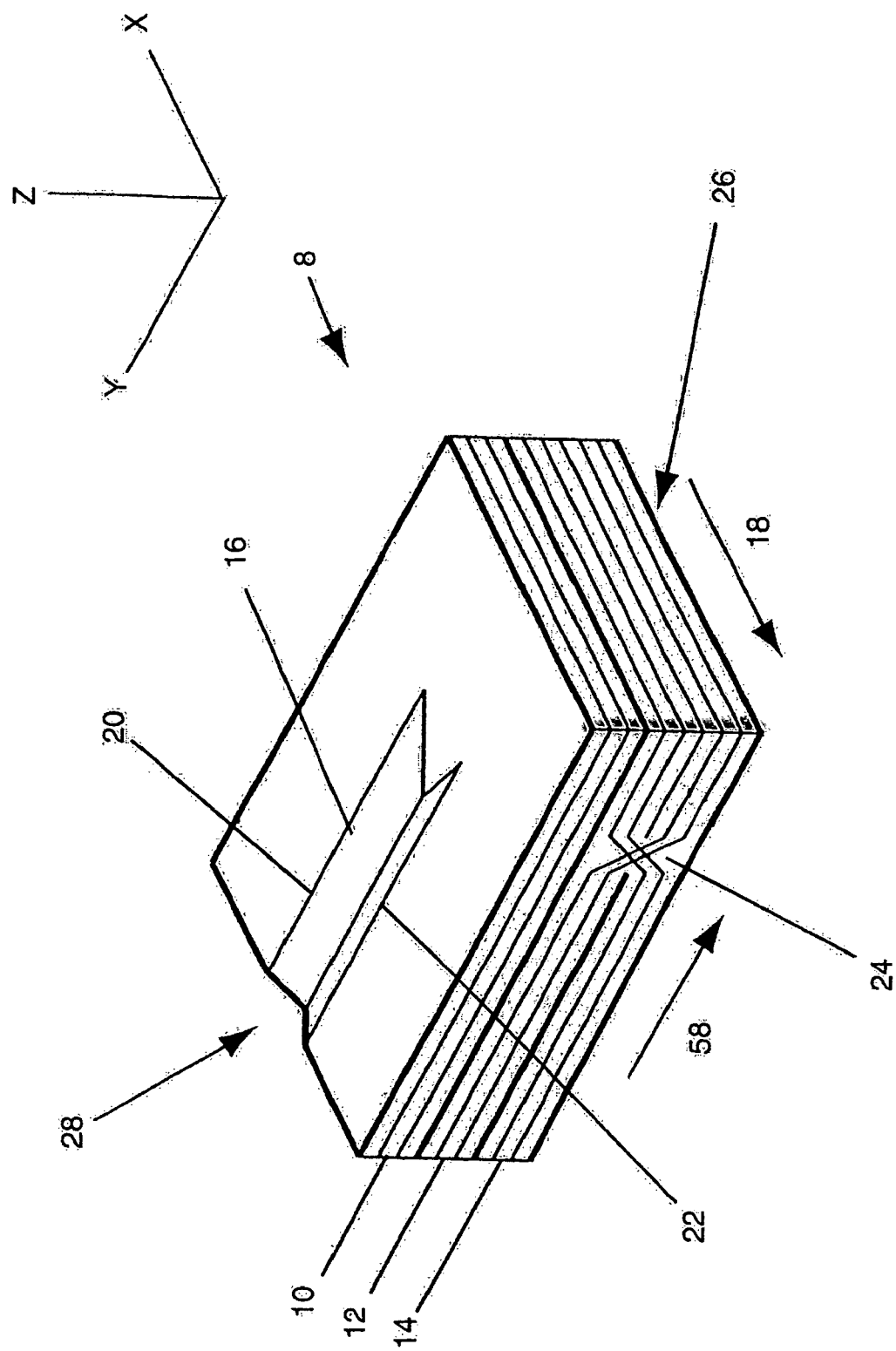
FIG. 1A is a view of the front of the base fabric depicting the interwoven regions, according to one embodiment of the present invention.

The present invention relates to a stiffened three-dimensional panel or skin with stiffeners provided in two directions that are an integral part of the panel or skin. Fibers are interwoven between the skin or panel portion and the stiffeners to lock the components together. This advantageously produces a much higher strength joint than previous methods because there is no longer a weak bond line between the components. Additionally, the preform is constructed from one piece of material, so all of the time associated with cutting plies for the laminated skin and stiffeners is eliminated. The preform is first woven as a flat preform in the form of a base fabric. The base fabric is then folded into a three-dimensional preform with a skin or panel portion having both transverse and longitudinal stiffeners. The resulting integrally woven preform can be processed into a composite component with the introduction of a matrix material using conventional techniques such as resin transfer molding or chemical vapor infiltration.

In the following description, like reference characters designate like or corresponding parts throughout the figures. Additionally, in the following description, it is understood that such terms as "front," "back," "left," "right," "transverse," "longitudinal," and the like are words of convenience and are not to be construed as limiting terms.

Figure 2A:
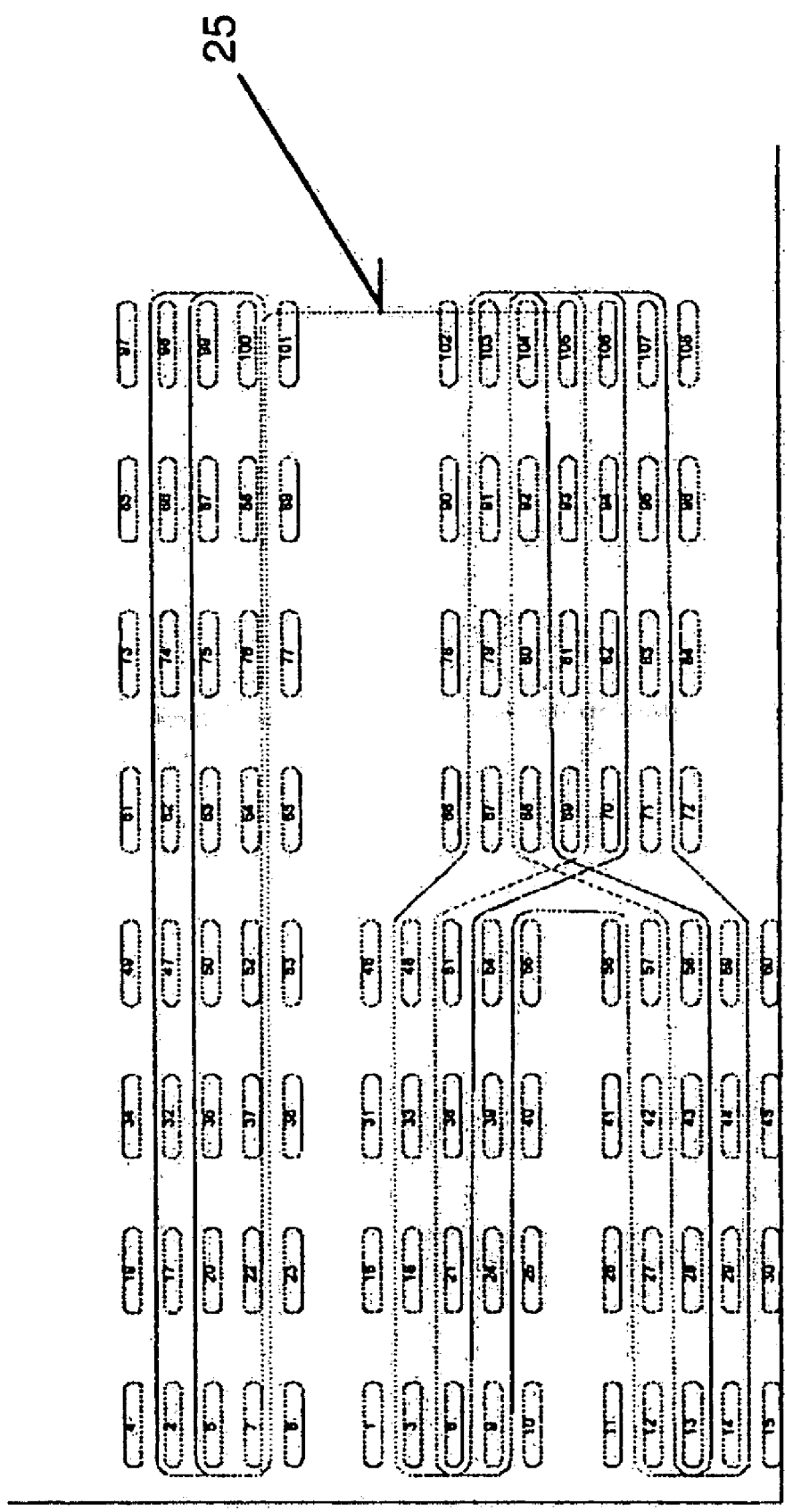
FIG. 2A is a sample architecture that can be used to weave a base fabric.
Figure 2B:
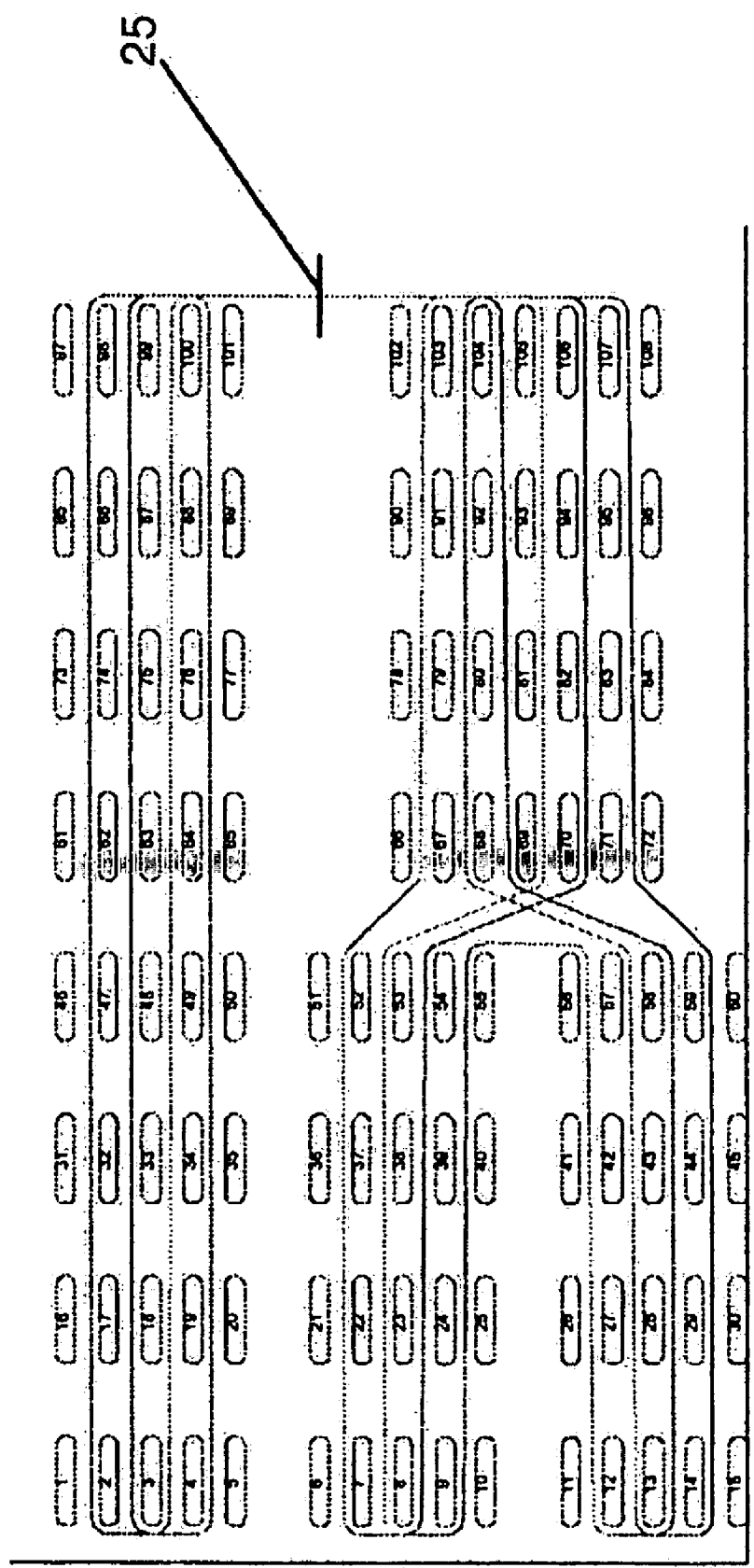
FIG. 2B is another sample architecture that can be used to weave the base fabric.

For purposes of the following discussion, it should be noted that a first stiffener or longitudinal stiffener extends in a first direction which is substantially aligned with the X coordinate or warp direction 18 depicted in FIG. 1A. A second stiffener or transverse stiffener which is generally perpendicular to the first stiffener extends in a second direction which is substantially aligned with the Y coordinate or the weft or fill direction 58 as depicted in FIG. 1A. The first and second stiffeners extend outwardly of the X-Y plane of the panel portion of the structure into the Z coordinate direction. The coordinate system used to define the structure is indicated in FIG. 1A. Further, in the examples shown, the fabrics were woven with warp yarns or fibers and weft or fill yarns or fibers using a Jacquard loom and captured shuttle, however, any conventional weaving technique, such as a harness loom, may be used to weave the fabrics. The yarns or fibers within each fabric can follow any pattern such as ply-to-ply, orthogonal, or angle interlock. The yarns or fibers used to weave the fabrics can be either synthetic or natural materials such as carbon, nylon, rayon, polyester, fiberglass, cotton, glass, ceramic, aramid ("KEVLAR") and polyethylene. Two similar fiber architectures depicted in FIG. 2A and FIG. 2B are representative of architectures that can be used to weave the base fabric. The fiber architectures used to weave the base fabric are not limited to the ones depicted.

Figure 1B:
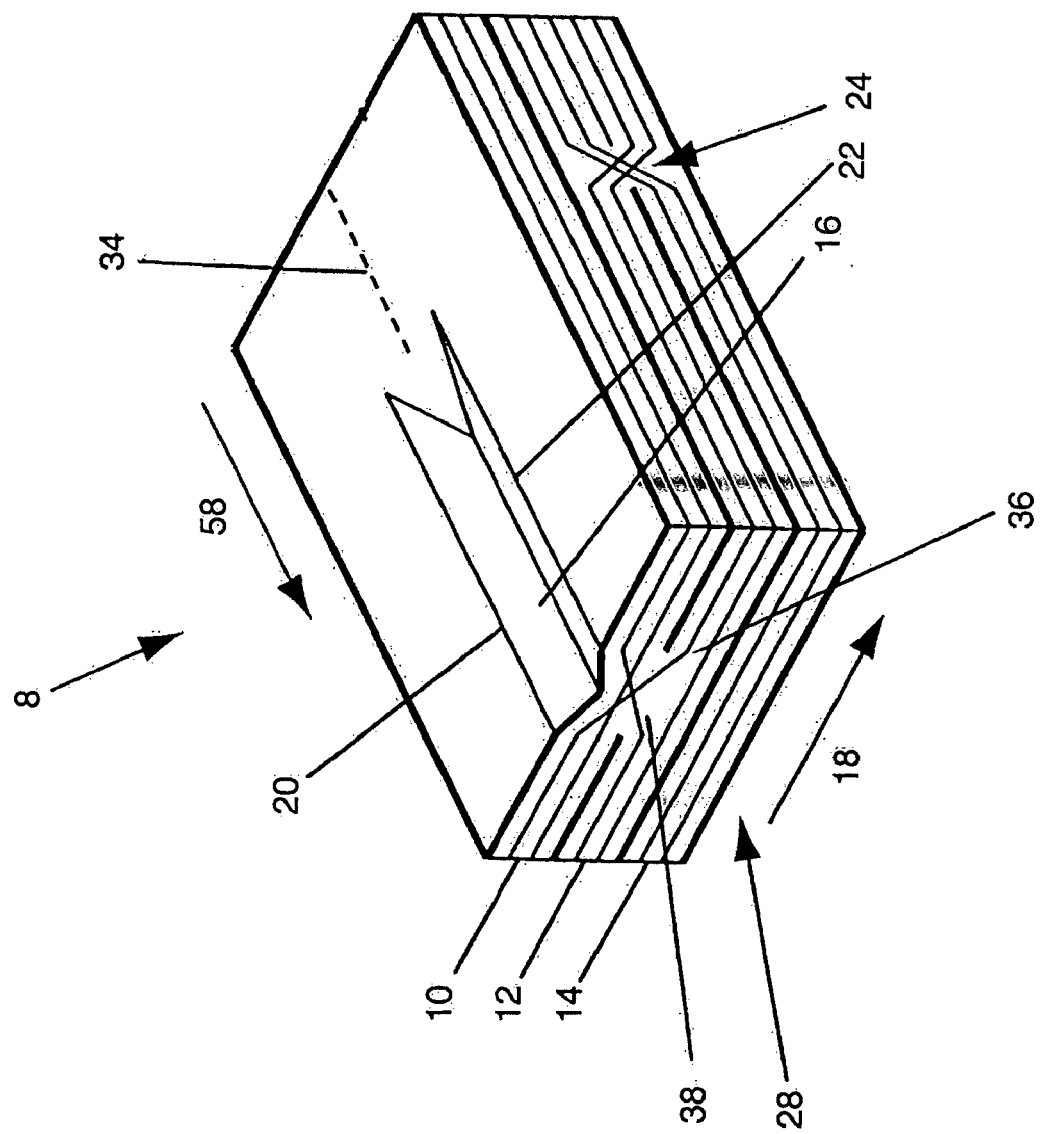
FIG. 1B is a view of the back of a base fabric depicting the interwoven regions, according to one embodiment of the present invention.

According to one aspect of the present invention as depicted in FIG. 1A and FIG. 1B, a base fabric 8 is constructed with three fabrics, a first woven fabric 10, a second woven fabric 12, and a third woven fabric 14. FIG. 1A is a view of the front of the base fabric 8 and FIG. 1B is a view of the back of the base fabric 8. At the back 28 of the base fabric 8, fibers from the right portion 20 of the first fabric 10 weave into the left portion 36 of the second fabric 12 and fibers from the left portion 22 of the first fabric 10 weave into the right portion 38 of the second fabric 12. Resulting is an interwoven region 16 between the first fabric 10 and second fabric 12. At the front portion 26 of the base fabric 8, fibers from the second fabric 12 and third fabric 14 interweave with each other along the entire warp direction 18 to produce interwoven region 24. It should be noted that the interwoven fibers between the fabrics can either be warp or fill fibers or yarns. The warp fibers within each fabric, 10, 12 and 14, can follow any conventional pattern, such as ply-to-ply, orthogonal, or angle interlock. This makes it possible to produce a preform that has a surface finish which mimics typical textile patterns such as plain weave, twill or satin. All edges parallel to the warp direction 18 will be closed if the base fabric 8 is woven on a shuttle loom. As shown in FIG. 2A and FIG. 2B, there may be some edge fibers 25 that weave various fabrics together and will have to be cut before the preform can be folded.

Figure 3:
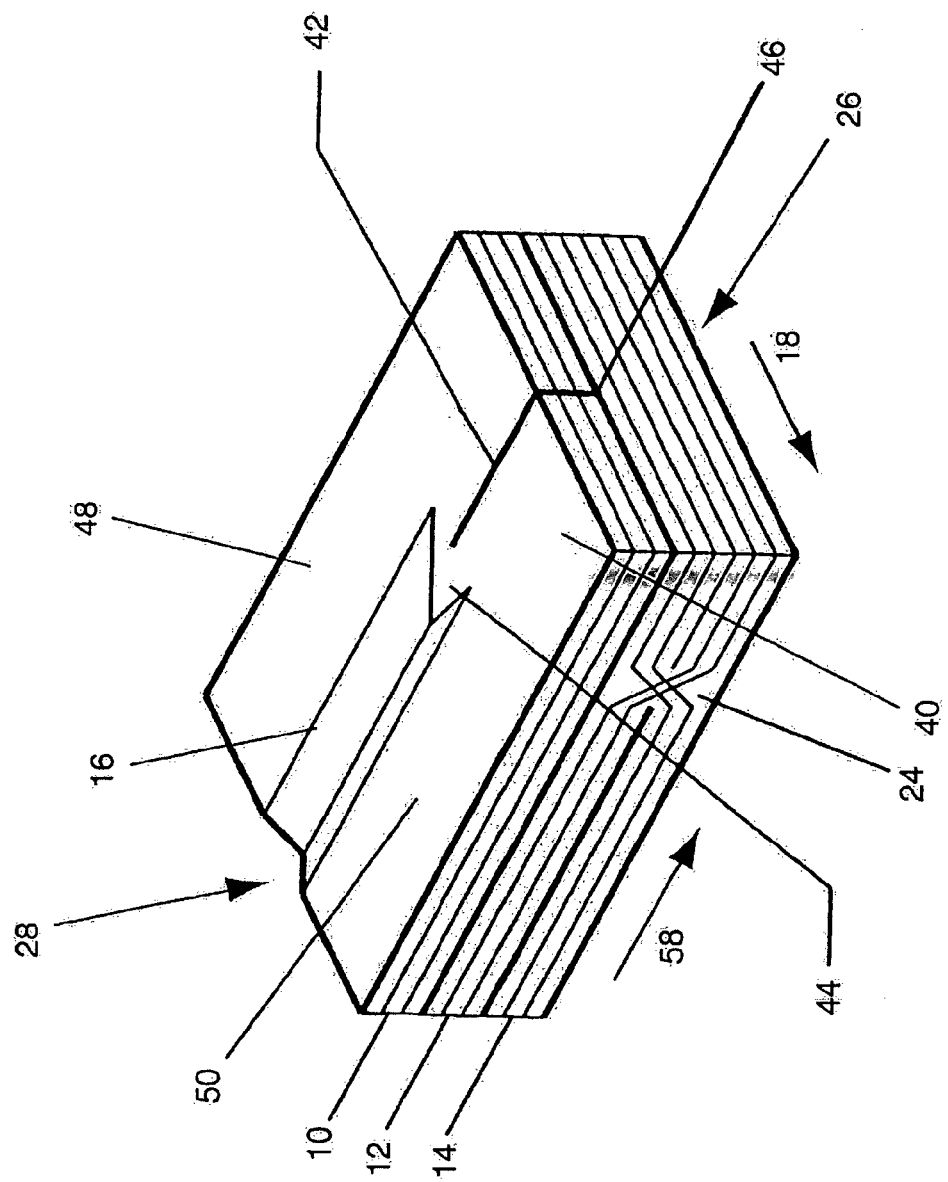
FIG. 3 is a view of the front of a base fabric depicting the cut line for the first woven fabric, according to one embodiment of the present invention.
Figure 4:
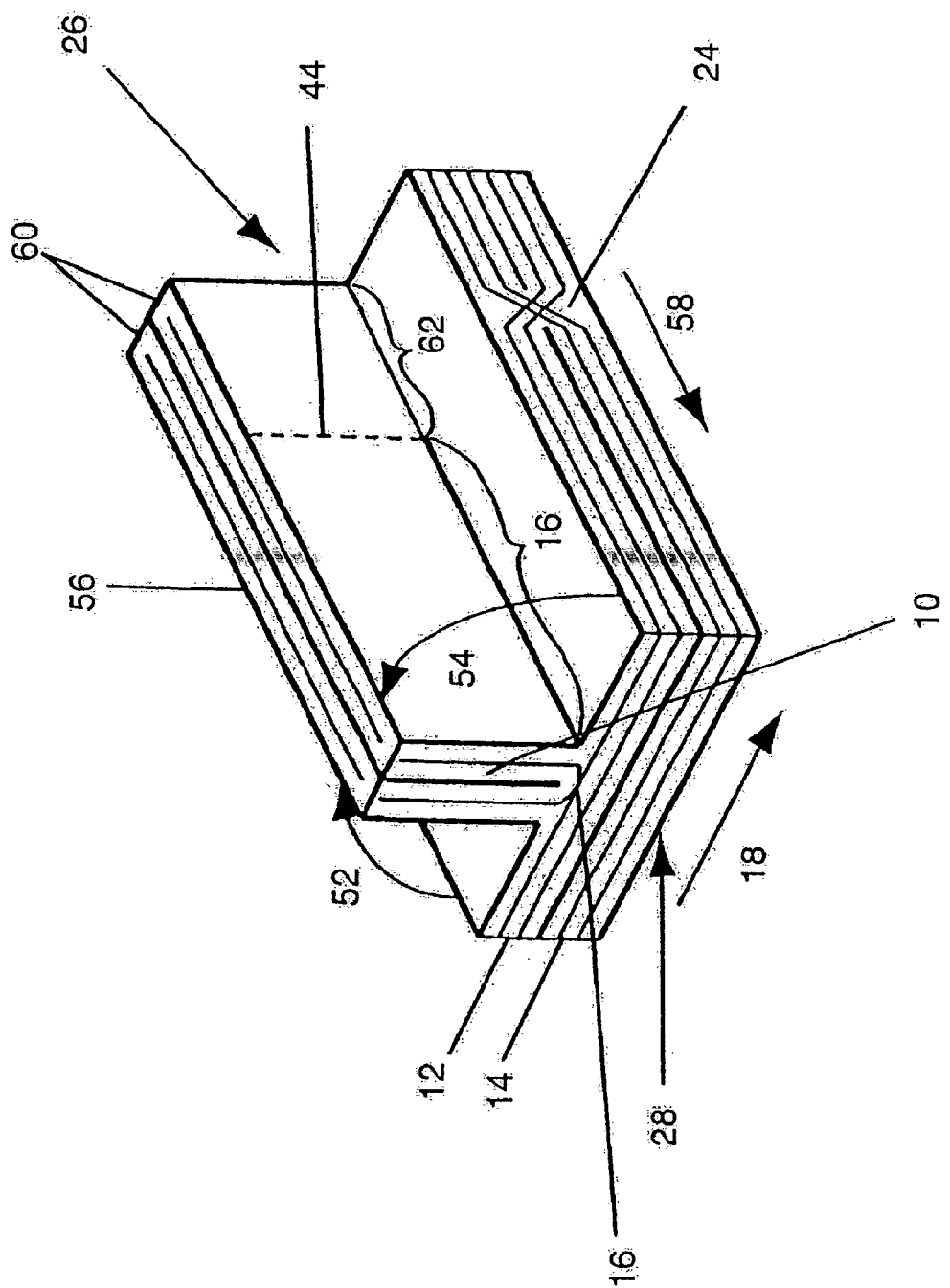
FIG. 4 is a view of the back of a base fabric depicting the formation of the transverse stiffener, according to one embodiment of the present invention.
Figure 5:
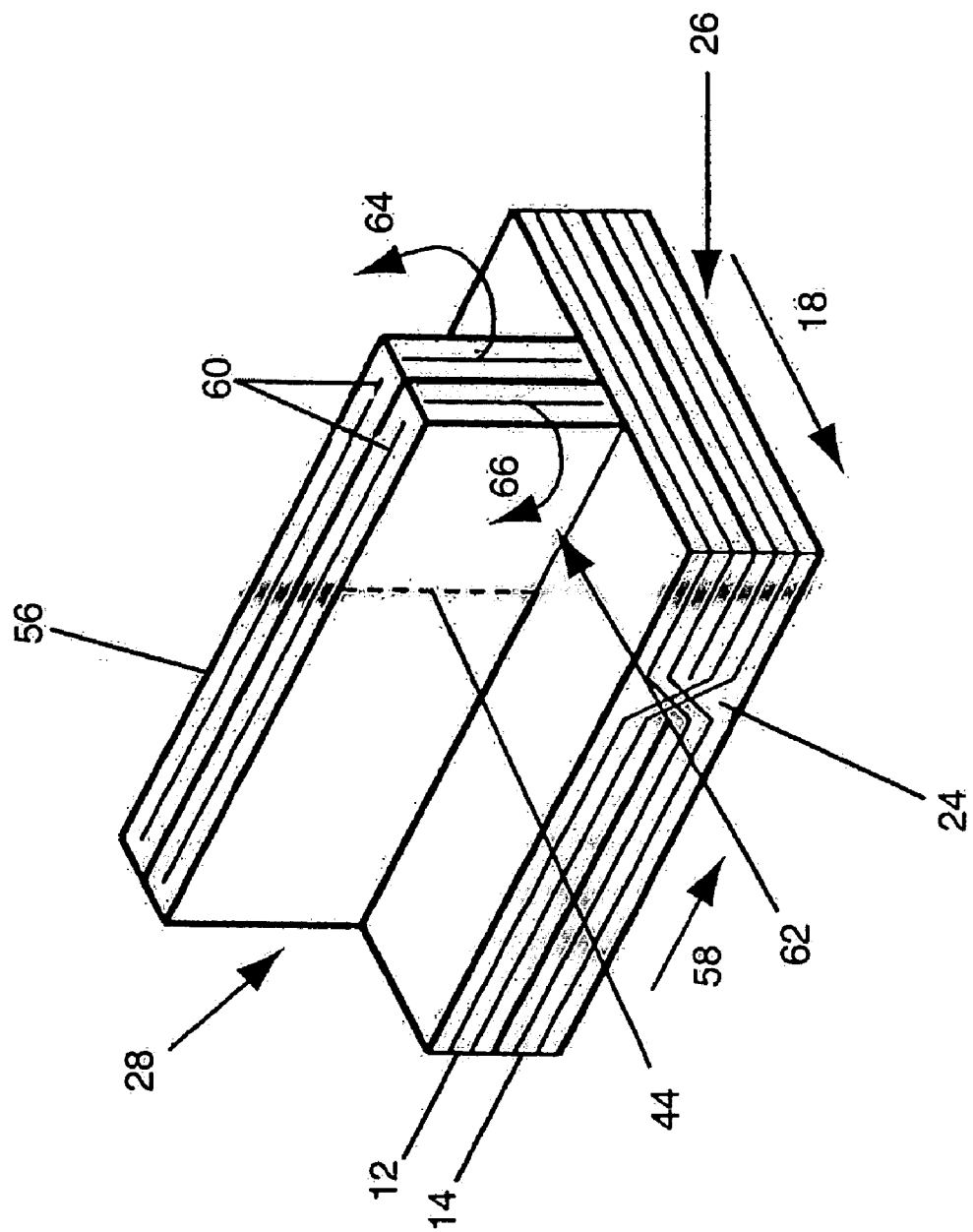
FIG. 5 is a view of the front of a base fabric depicting the formation of the transverse stiffener, according to one embodiment of the present invention.
Figure 6:
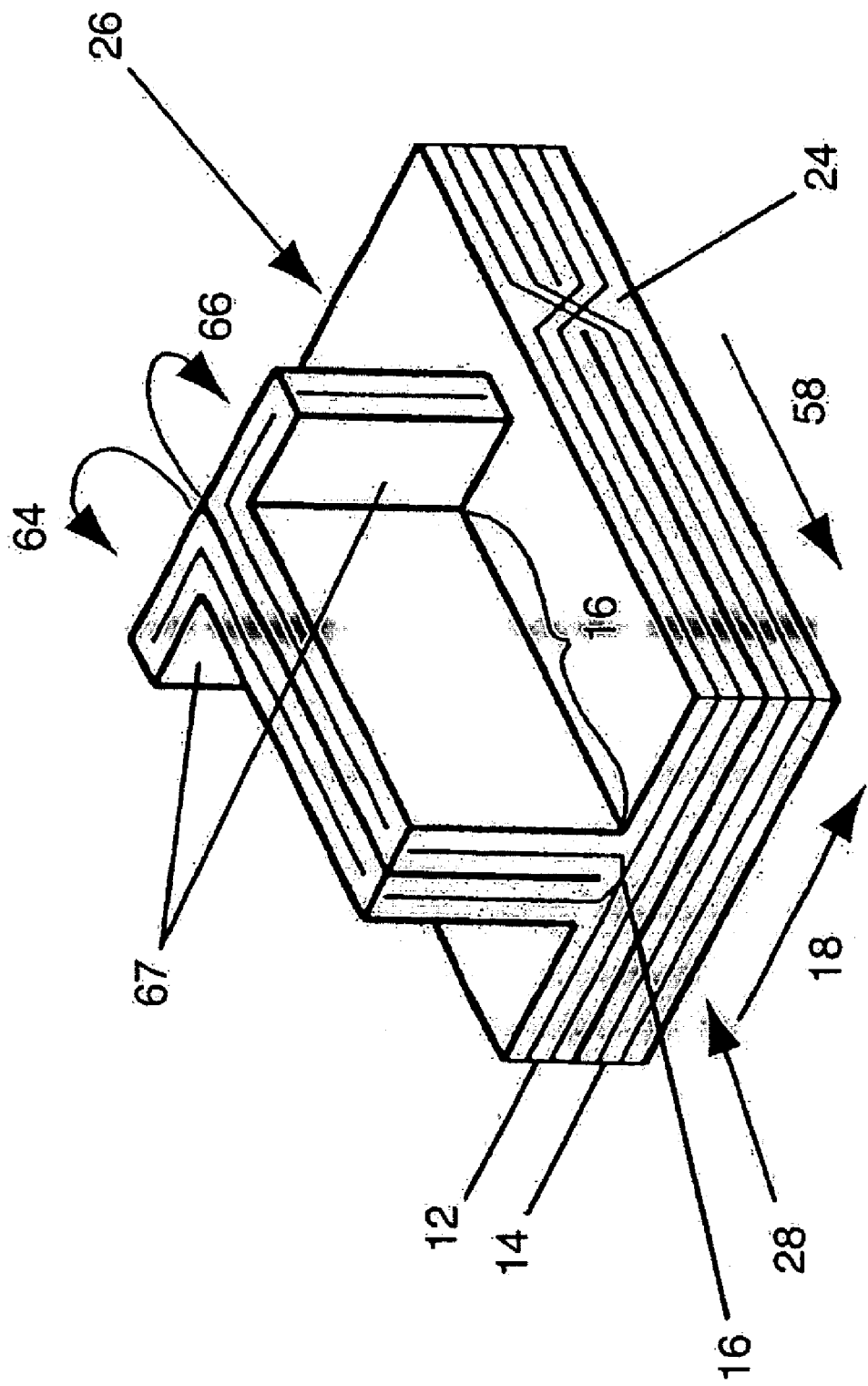
FIG. 6 is a view of the back of a base fabric depicting the formation of the longitudinal stiffener reinforcing members, according to one embodiment of the present invention.
Figure 7:
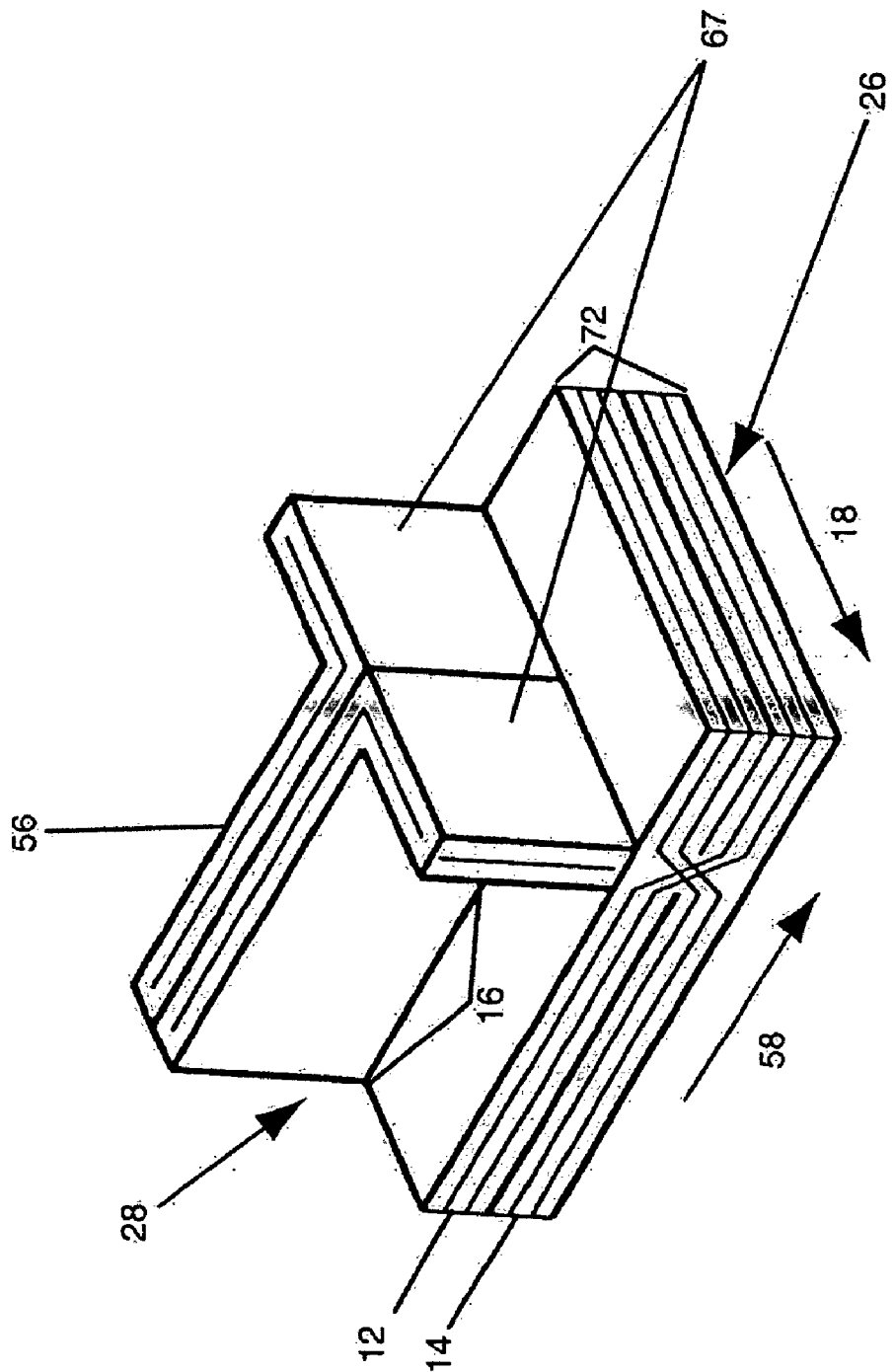
FIG. 7 is a view of the front of a base fabric depicting the formation of the longitudinal stiffener reinforcing members, according to one embodiment of the present invention.
Figure 8:
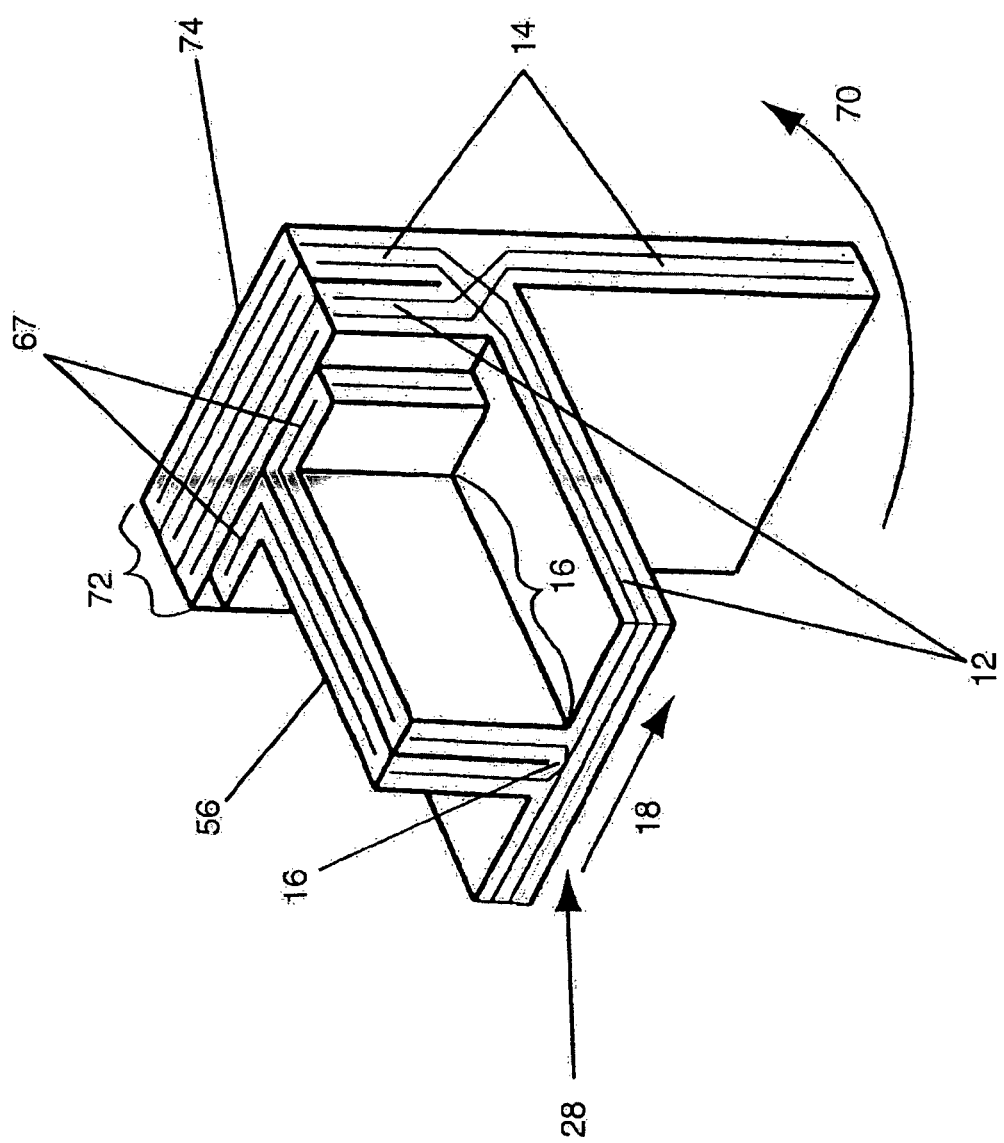
FIG. 8 is a view of the back of a base fabric depicting the formation of a longitudinal stiffener, according to one embodiment of the present invention.
Figure 9:
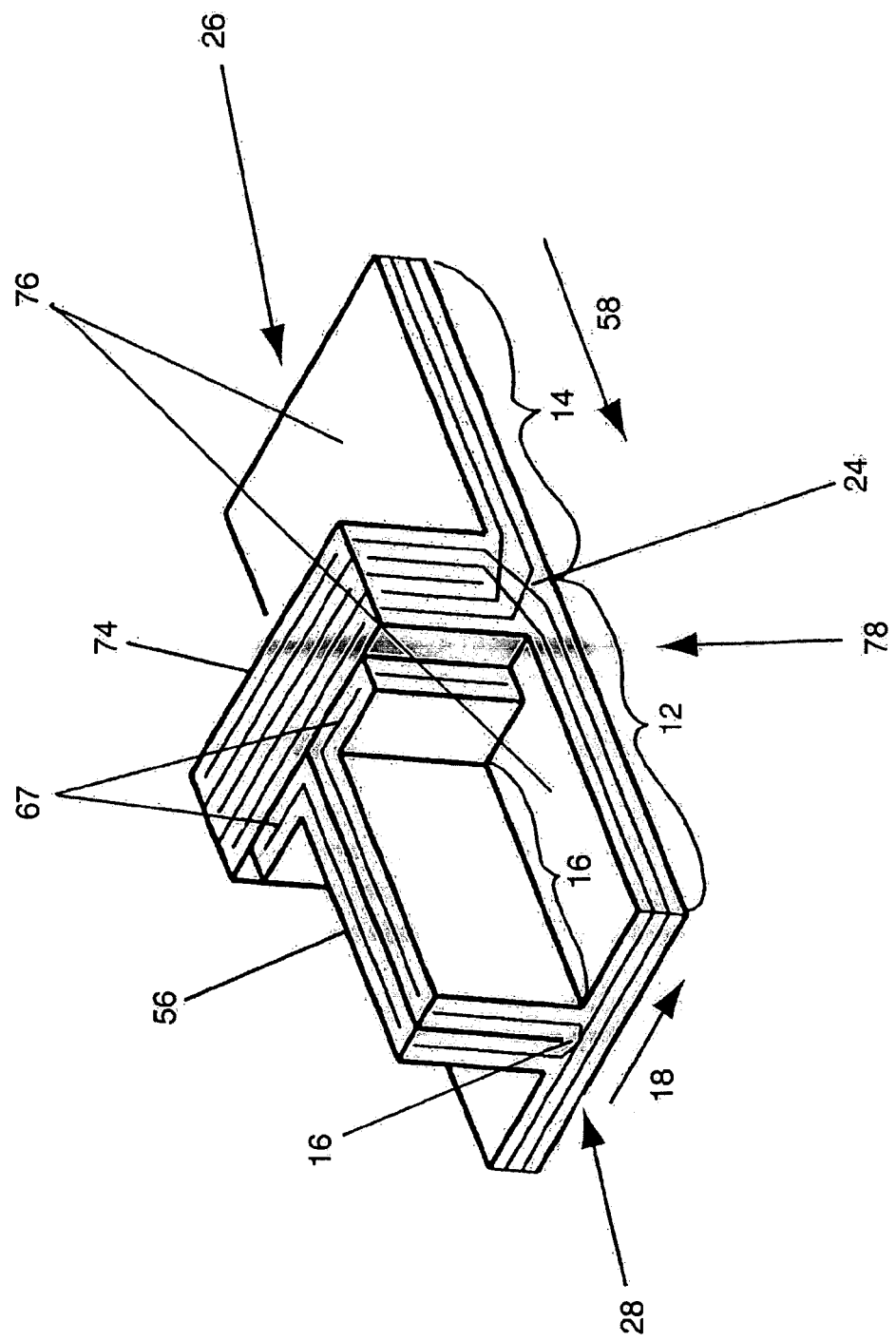
FIG. 9 is a view of the back of a base fabric depicting the formation of the integrally woven three-dimensional preform's panel portion, according to one embodiment of the present invention.
Figure 10:
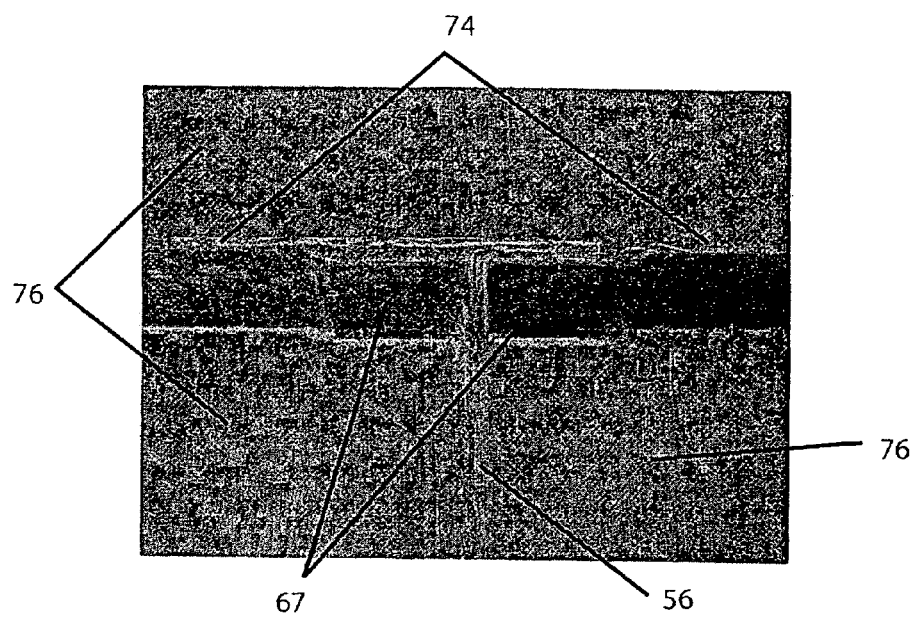
FIG. 10 is a top view of a completed three-dimensional stiffened component structure with one longitudinal stiffener and one transverse stiffener, according to one embodiment of the present invention.
Figure 11:
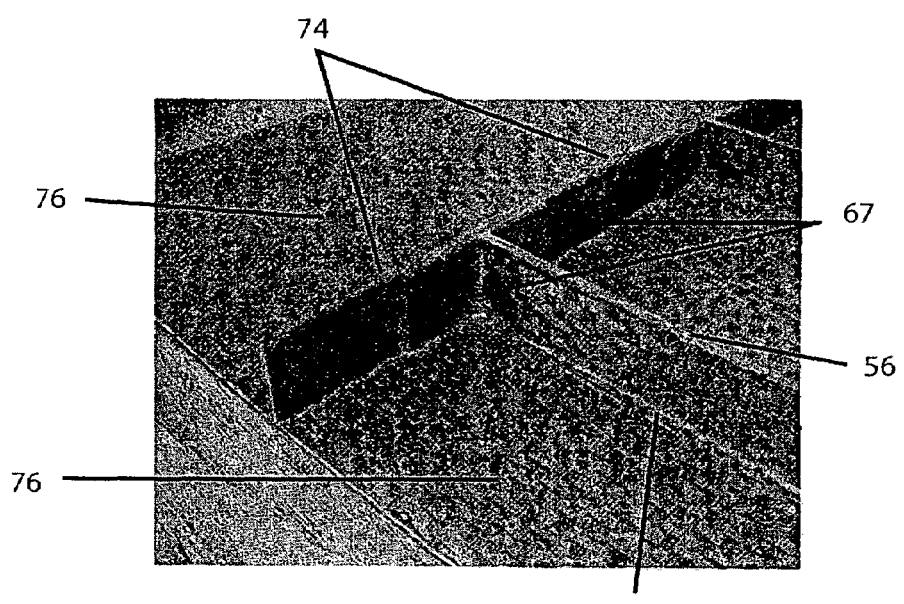
FIG. 11 is a somewhat topside view of a completed integrally woven three-dimensional stiffened component structure with one longitudinal stiffener and one transverse stiffener, according to one embodiment of the present invention.

Once the base fabric 8, together with its interwoven regions 16 and 24, has been woven, it can now be folded to form an integrally woven three-dimensional preform with longitudinal and transverse stiffeners. In FIG. 3, the front portion 40 of the first fabric 10 is cut 42 to the point where the first fabric 10 and second fabric 12 interweave together 44. The front portion 40 of the first fabric 10 is also cut 42 to the top surface 46 of the second fabric 12. After the first fabric 10 is cut 42, the two halves or portions 48 and 50 can now be folded as indicated by arrows 52 and 54 in FIG. 4 to form a transverse stiffener 56 in the Y or fill direction 58. A portion of the transverse stiffener 56, which is also the first fabric 10, remains integrally connected to the second fabric 12 because of the interwoven region 16 between itself and the second fabric 12. The front portions 60 of the transverse stiffener 56 are not connected to the second fabric 12 because the fabrics were not interwoven in region 62. Therefore, as indicated in FIG. 5, the front portions 60 of the transverse stiffener 56 can be unfolded as indicated by arrows 64 and 66 to act as reinforcing members 67 for a stiffener that will be formed in this direction as depicted in FIG. 6 and FIG. 7. Lastly, as depicted in FIG. 8, which is a rear view of the preform, the back portion 28 of the third fabric 14 can be folded forward as indicated by arrow 70 to complete the stiffened preform. When this is done, the front portions 72 of the combined second 12 and third 14 fabrics fold into the Z direction to form longitudinal stiffener 74 in the X or warp direction. Upon continuing to fold the third fabric 14 up in the Z direction as indicated by arrow 70, the third fabric 14 completes the panel portion 76 of the integrally woven three-dimensional preform 78 as depicted in FIG. 9. For some geometries, the height of the longitudinal stiffener 74 might be too high and therefore may need to be trimmed down to the same height as the transverse stiffener 56 and vice versa. FIG. 10 and FIG. 11 are pictures of a base fabric that has been folded using the disclosed method to form an integrally woven three-dimensional preform. The preform has been molded into a composite structure with the addition of a matrix material. Both pictures depict the composite structure's panel portion 76, interwoven region 16, transverse stiffener 56, longitudinal stiffener reinforcing members 67, and longitudinal stiffener 74.

Figure 12:
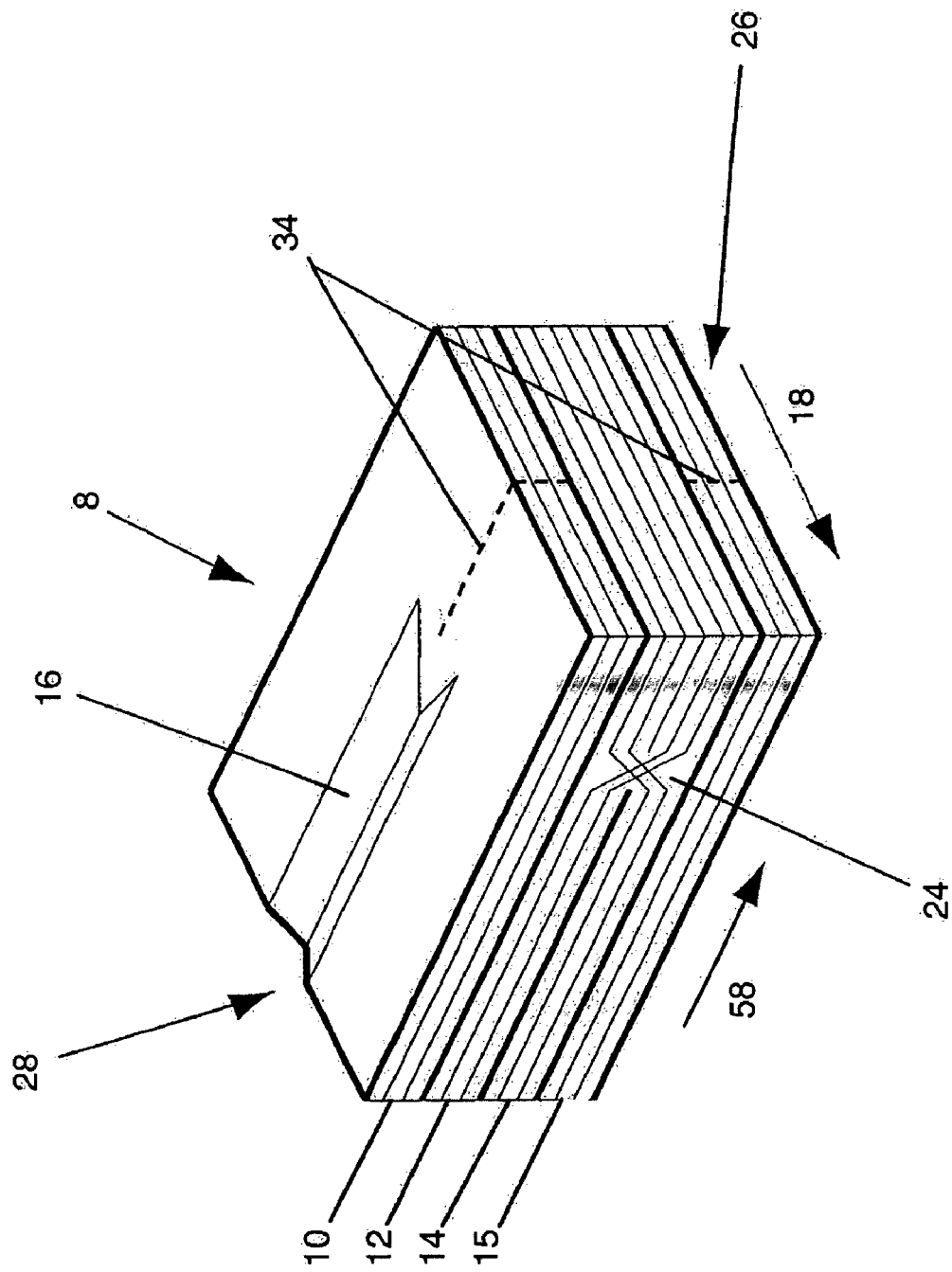
FIG. 12 is a view of the front of a base fabric designed to produce a symmetrical integrally woven three-dimensional preform with longitudinal and transverse stiffeners, according to one embodiment of the present invention.
Figure 13:
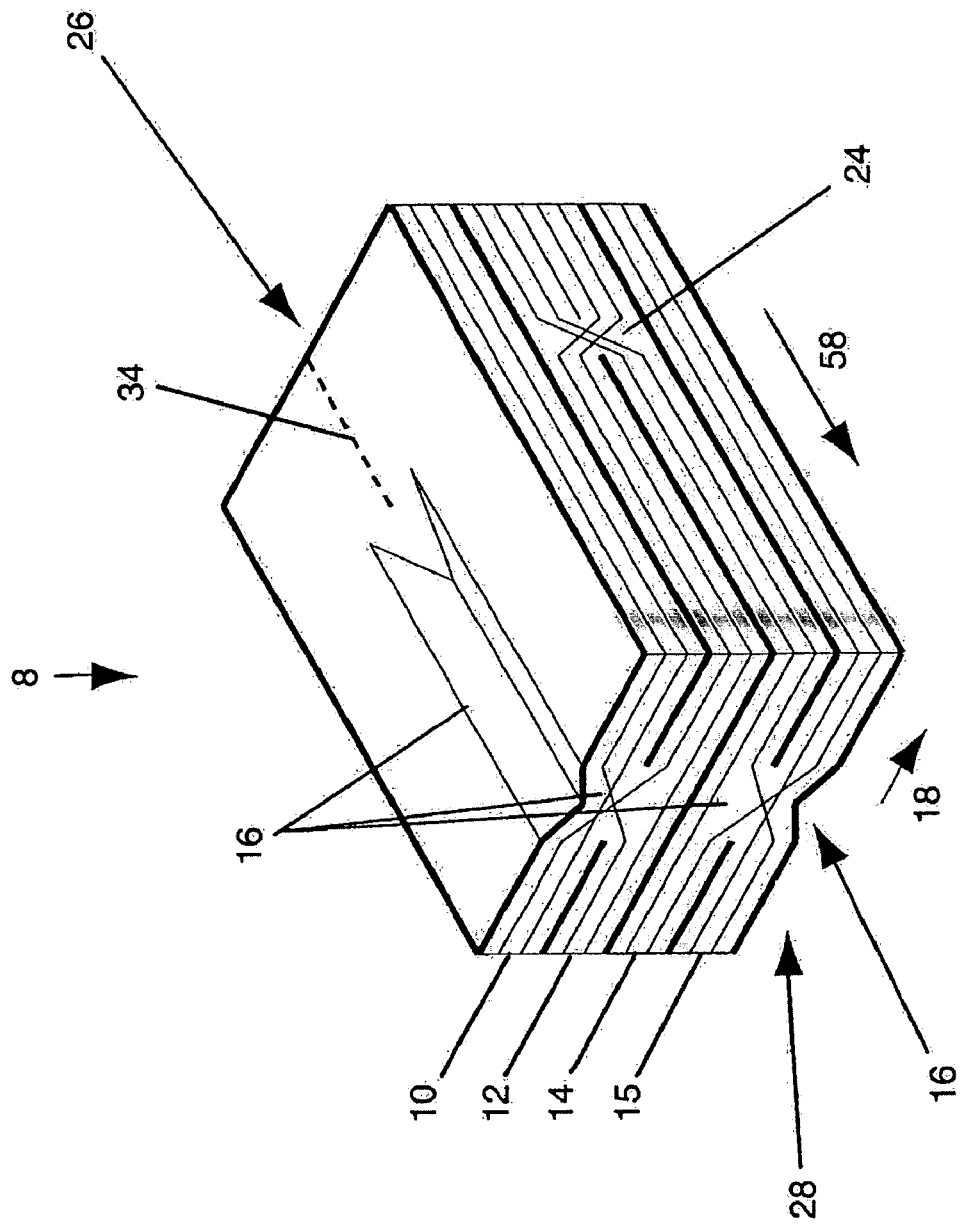
FIG. 13 is a view of the back of a base fabric designed to produce a symmetrical integrally woven three-dimensional preform with longitudinal and transverse stiffeners, according to one embodiment of the present invention.
Figure 14:
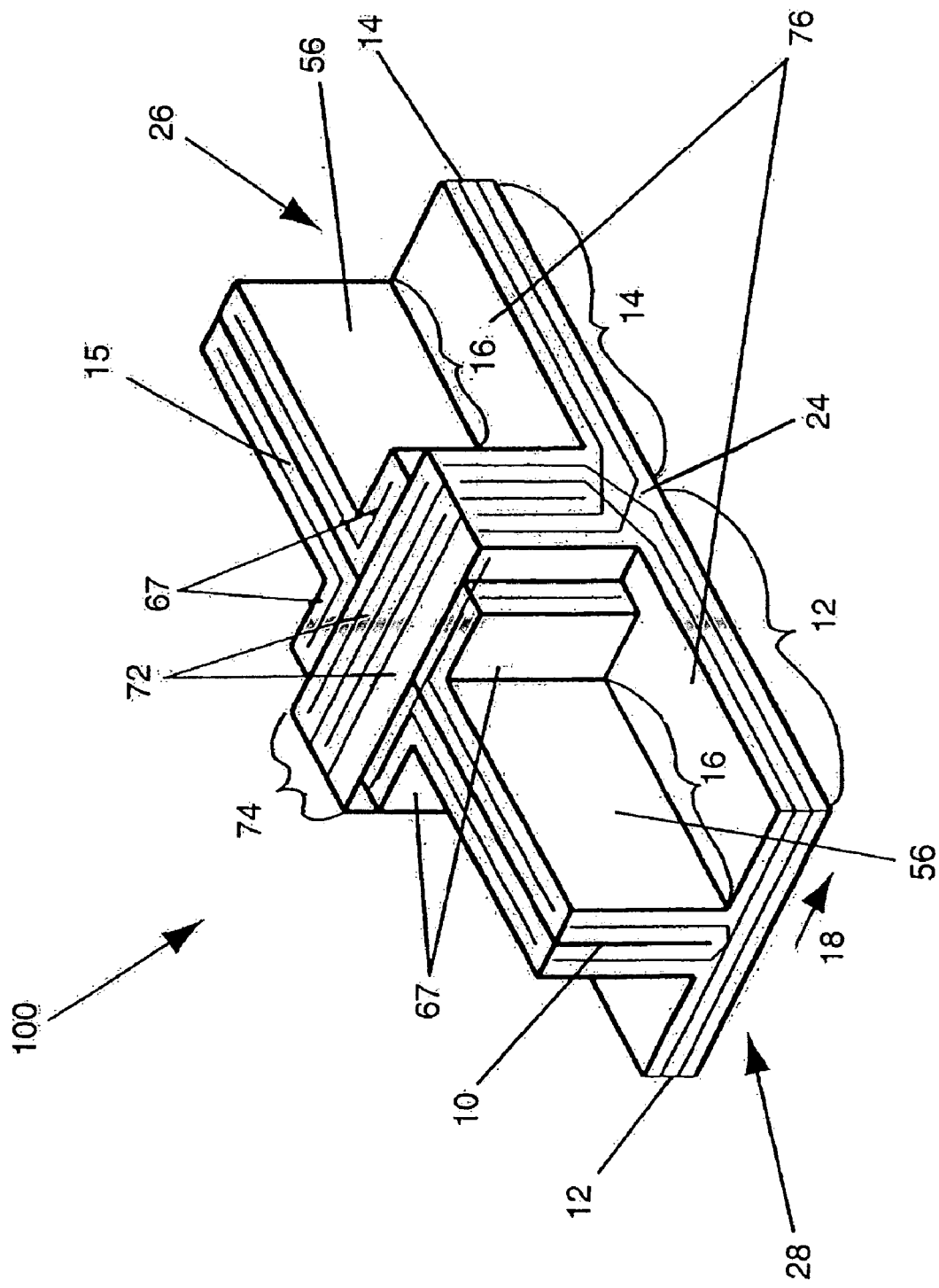
FIG. 14 is a view of the back of a symmetric integrally woven three-dimensional preform with longitudinal and transverse stiffeners, according to one embodiment of the present invention.
Figure 15:
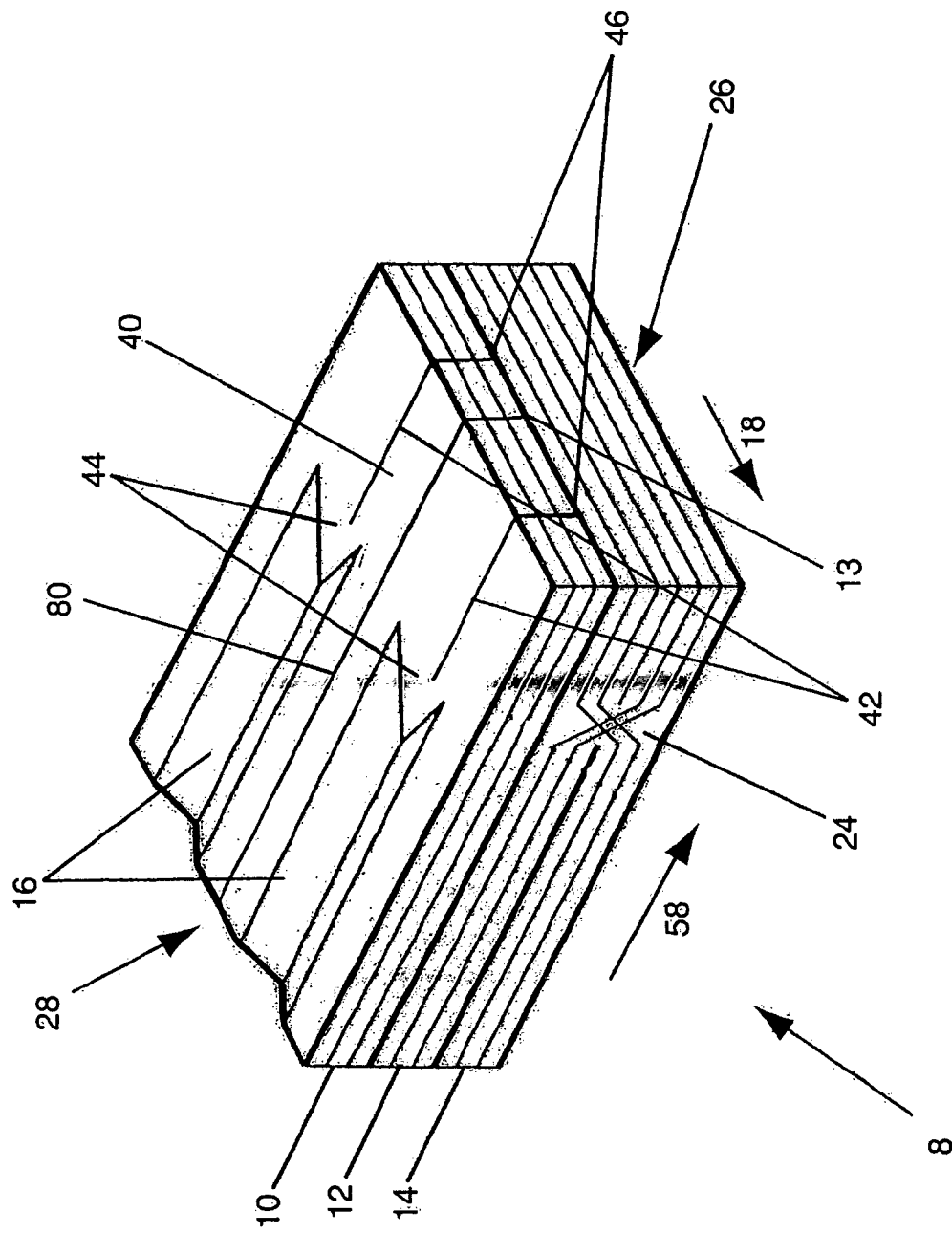
FIG. 15 is a view of the front of a base fabric designed to produce an integrally woven three-dimensional preform with a longitudinal stiffener and a plurality of transverse stiffeners, constructed according to one embodiment of the present invention.
Figure 16:
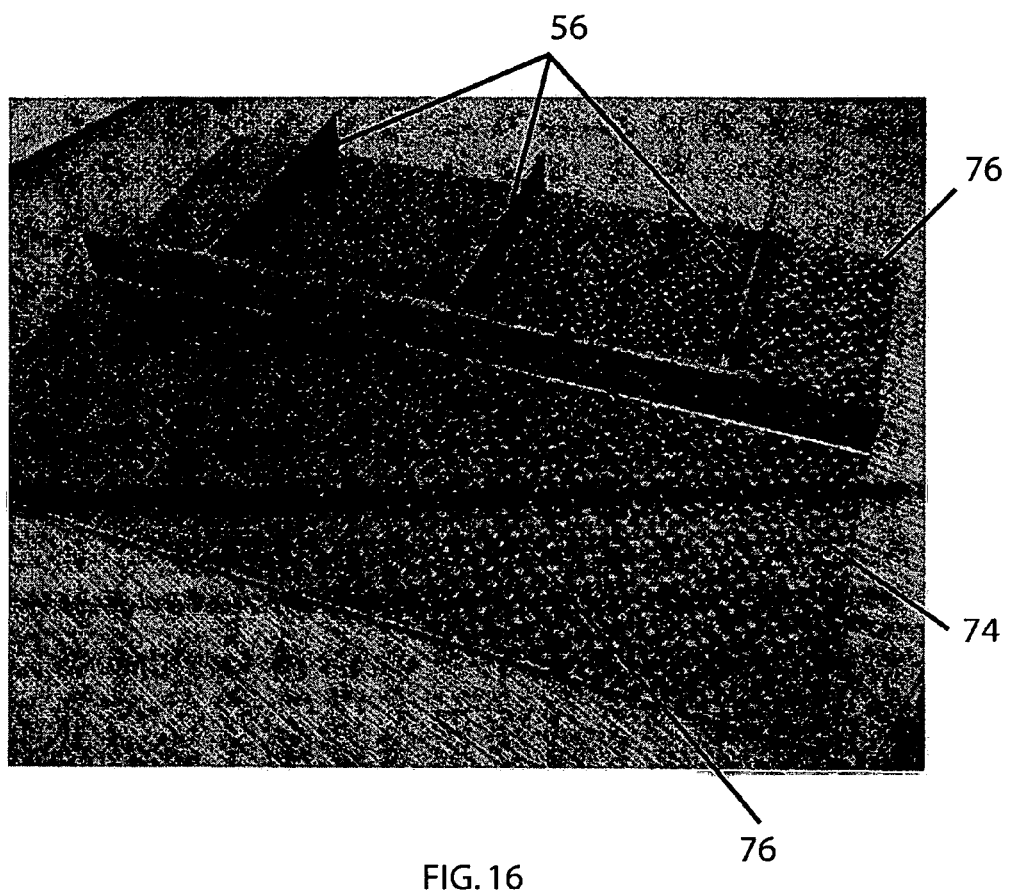
FIG. 16 is a picture of a completed integrally woven three-dimensional component structure with one longitudinal stiffener and a plurality transverse stiffener, constructed according to one embodiment of the present invention.

Another aspect of the present invention is used to create stiffened panels with a symmetric configuration that will produce transverse stiffeners on both sides of the longitudinal stiffener. FIG. 12 depicts a base fabric 8 constructed with four fabrics, a first woven fabric 10, a second woven fabric 12, a third woven fabric 14 and a fourth woven fabric 15. In addition to interweaving a region 16 between the first fabric 10 and the second fabric 12, a region 16 is also interwoven between the third fabric 14 and the fourth fabric 15 as depicted in FIG. 13. As previously disclosed, the base fabric 8 also has an interwoven region 24 between the second fabric 12 and the third fabric 14 at the front 26 of the fabric. Once the base fabric 8 is woven, the first fabric 10 and fourth fabric 15 are both cut and folded as previously disclosed to produce transverse stiffeners 56 with reinforcing members 67 and a longitudinal stiffener 74 as depicted in FIG. 14. The transverse stiffeners 56 are formed when the first fabric 10 and fourth fabric 15 are folded. Panel portion 76 is formed from the second fabric 12 and the folded portion of the third fabric 14. Longitudinal stiffener 74 is comprised of the front portions 72 of the second fabric 12 and third fabric 14 that fold up into the Z direction. As a result, a three-dimensional woven preform 100 with symmetry about the longitudinal stiffener 74 is formed In another aspect of the present invention, stiffened panels with a plurality of transverse stiffeners 56 can also be created by interweaving a plurality of regions 16 between the first 10 and second 12 fabrics as depicted in FIG. 15 using the same method previously described to interweave the first woven fabric 10 with the second woven fabric 12. Once all of the interwoven portions 16 and 24 are woven, the fabric can now be cut in order to facilitate folding into a three-dimensional preform. The steps are the same as disclosed for an integrally woven three-dimensional preform with one longitudinal stiffener except for the following. The first woven fabric 10 is cut 80 from the back 28 to the front 26 of the base fabric 8 through to the top 13 of the second woven fabric 12. The location of the cut 80 is such that the first woven fabric 10 can be folded in a plurality of areas to form a plurality of transverse stiffeners. Next, the front portion 40 of the first fabric 10 is cut back 42 in a plurality of areas to the regions 44 where the first fabric 10 and second fabric 12 interweave together. The front portion 40 of the first fabric 10 is also cut down to the top 46 of the second fabric 12. Once cutting is completed, the base fabric 8 is folded into an integrally woven three-dimensional preform following the same steps as previously disclosed except that a plurality of portions on both sides of the plurality of interwoven regions between the first and second fabrics are folded together to form a plurality of transverse stiffeners. FIG. 16 is a picture of a folded integrally woven three-dimensional reinforcing fabric with a plurality of transverse stiffeners that has been molded into a composite component with the introduction of a matrix material. As depicted, the stiffened panel comprises panel portion 76, longitudinal stiffener 74 and a plurality of transverse stiffeners 56.

After the base fabric is folded into an integrally woven three-dimensional preform with longitudinal and transverse stiffeners, the composite stiffened panel or component can now be formed with the introduction of a matrix material such as epoxy, polyester, vinyl-ester, ceramic, carbon and/or other materials, which also exhibit desired physical, thermal, chemical and/or other properties, using convectional techniques such as resin transfer molding or chemical vapor infiltration.

Accordingly, it has been shown that a base fabric can be designed and shaped into a three dimensional woven preform with integral stiffeners in two directions.

Although a preferred embodiment of the present invention and modifications thereof have been described in detail herein, it is to be understood that this invention is not limited to this precise embodiment and modifications, and that other modifications and variations may be effected by one skilled in the art without departing from the spirit and scope of the invention as defined by the appended claims.

What is claimed is:

1. An integrally woven three-dimensional preform comprising:
   a base fabric comprising:
      a first woven fabric;
      a second woven fabric;
      a third woven fabric;

a plurality of yarns interwoven between said first woven fabric and said second woven fabric, wherein said plurality of yarns are interwoven over a region between said first fabric and said second fabric and said first fabric is foldable relative to said second fabric; and a plurality of yarns interwoven between said second woven fabric and said third woven fabric, wherein said plurality of yarns are interwoven over a region between said second fabric and said third fabric and said third fabric is foldable relative to said second fabric, wherein said first fabric foldable relative to said second fabric is folded to form a first stiffening rib in a first direction, and said third fabric foldable relative to said second fabric is folded to form a second stiffening rib in a direction substantially perpendicular to said first stiffening rib.

2. The woven base fabric of claim 1, wherein said base fabric is woven using a Jacquard loom.

3. The woven fabric of claim 1, wherein said base fabric is woven using a harness loom.

4. The woven base fabric of claim 1, wherein said first woven fabric is cut from a top surface of said second woven fabric.

5. The woven base fabric of claim 4, wherein a first portion on a first side of an interwoven region of said first woven fabric is foldable together with a first portion on a second side of the interwoven region of said first woven fabric to form a stiffener in a first direction.

6. The woven base fabric of claim 5, wherein a second portion of said stiffener is foldable to form a reinforcing member for a stiffener formed in a second direction.

7. The woven base fabric of claim 1, wherein said third woven fabric is foldable relative to said first and said second woven fabrics.

8. The woven base fabric of claim 7, wherein a first portion of said foldable second woven fabric and a first portion of said third woven fabric form a stiffener in a second direction.

9. The woven base fabric of claim 8, wherein a second portion of said foldable second woven fabric is coplanar with a second portion of said third woven fabric, to form a panel portion of said three-dimensional preform.

10. The woven base fabric of claim 1, wherein a plurality of yarns are interwoven between said first and said second woven fabrics in a plurality of independent regions.

11. The woven base fabric of claim 10, wherein said first woven fabric is foldable relative to said second and said third woven fabrics.

12. The woven base fabric of claim 10, wherein said first woven fabric is cut from a top surface of said second woven fabric in a plurality of regions.

13. The woven base fabric of claim 12, wherein a plurality of first portions on a plurality of first sides of a plurality of said interwoven regions of said first and second woven fabrics are foldable together with a plurality of first portions on a plurality of second sides of a plurality of said interwoven regions of said first and second woven fabrics to form a plurality of stiffeners in a first direction.

14. The woven base fabric of claim 13, wherein second portions of said plurality of stiffeners are foldable to form a plurality of reinforcing members for a stiffener formed in a second direction.

15. The woven base fabric of claim 10, wherein said second and said third woven fabrics are foldable relative to said first woven fabric.

16. The woven base fabric of claim 15, wherein a first portion of said foldable second woven fabric and a first portion of said foldable third woven fabric provide a stiffener in a second direction.

17. The woven base fabric of claim 15, wherein a second portion of said second woven fabric is coplanar with a second portion of said third woven fabric.

18. The woven base fabric of claim 1 further comprising:
a fourth woven fabric; and
a plurality of yarns interwoven between said third woven fabric and said fourth woven fabric, wherein said plurality of yarns are interwoven over a region between said third fabric and said fourth fabric to allow said fourth woven fabric to be foldable relative to said third woven fabric.

19. The woven base fabric of claim 18, wherein said first woven fabric is foldable relative to said second, said third and said fourth woven fabrics.

20. The woven base fabric of claim 18, wherein said first woven fabric is cut from a top surface of said second woven fabric.

21. The woven base fabric of claim 20, wherein a first portion on a first side of an interwoven region of said first and second woven fabrics is foldable together with a first portion on a second side of the interwoven region of said first and second woven fabrics to form a stiffener in a first direction.

22. The woven base fabric of claim 21, wherein a portion of said stiffener is foldable to form a reinforcing member for a stiffener formed in a second direction.

23. The woven base fabric of claim 18, wherein said third and said fourth woven fabrics are foldable relative to said first and said second woven fabrics.

24. The woven base fabric of claim 18, wherein said fourth woven fabric is cut from a top surface of said third woven fabric.

25. The woven base fabric of claim 24, wherein a first portion on a first side of an interwoven region of said third and said fourth woven fabrics is foldable together with a first portion on a second side of the interwoven region of said third and said fourth woven fabrics to form a stiffener in a first direction.

26. The woven base fabric of claim 25, wherein a second portion of said stiffener is foldable to form a reinforcing member for a stiffener formed in a second direction.

27. The woven base fabric of claim 26, wherein a first portion of said foldable second and third woven fabrics provide a stiffener formed in the second direction.

28. The woven base fabric of claim 27 wherein a second portion of said foldable second woven fabric is coplanar with a second portion of said third woven fabric.

29. The woven base fabric of claim 28 wherein the resulting folded three-dimensional preform has a symmetrical configuration.

30. The woven base fabric of claim 1, wherein said fabrics are woven with warp and weft yarns or fibers.

31. The woven base fabric of claim 30, wherein the warp fiber pattern is any pattern selected from the group consisting of ply-to-ply, orthogonal, and angle interlock.

32. The woven base fabric of claim 30, wherein the interwoven yarns are warp yarns.

33. The woven base fabric of claim 30, wherein the interwoven yarns are weft yarns.

34. The woven base fabric of claim 30, wherein said warp and weft yarns are selected from the group of synthetic or natural materials consisting of carbon, nylon, rayon, polyester, fiberglass, cotton, glass, ceramic, aramid, and polyethylene.

35. The woven preform of claim 1 wherein a composite structure is formed from a process selected from the group consisting of resin transfer molding and chemical vapor filtration.

36. The composite structure of claim 35, wherein a matrix material is selected from the group consisting of epoxy, polyester, vinyl-ester, ceramic, and carbon.

37. An integrally woven three dimensional preform comprising:
 three or more woven fabrics;
 a first stiffener constructed from a foldable first fabric with a plurality of yarns interwoven between a first fabric and a second fabric, at least a portion of said first stiffener folded to reinforce a stiffener in a second direction;
 a second stiffener in angular relation to said first stiffener, said second stiffener constructed from a portion of the second fabric and a third fabric; and
 a foldable third fabric with a plurality of yarns interwoven between said second fabric and said third fabric.

38. The integrally woven three dimensional preform of claim 37, wherein said preform is woven using a Jacquard loom.

39. The integrally woven three dimensional preform of claim 37, wherein said preform is woven using a harness loom.

40. The integrally woven three dimensional preform of claim 37, wherein the woven fabrics are woven with warp and weft yarns or fibers.

41. The integrally woven three dimensional preform of claim 37, wherein said preform has a symmetrical configuration.

42. The integrally woven three dimensional preform of claim 37, wherein said preform has one stiffener in a first direction and a plurality of stiffeners in a second direction, said plurality of stiffeners in angular relation to said first stiffener.

43. The integrally woven three dimensional preform of claim 37, wherein the warp fiber pattern is any pattern selected from the group consisting of ply-to-ply, orthogonal, and angle interlock.

44. The integrally woven three dimensional preform of claim 37, wherein the interwoven yarns are warp yarns.

45. The integrally woven three dimensional preform of claim 37, wherein the interwoven yarns are weft yarns.

46. The integrally woven three dimensional preform of claim 37, wherein said warp and weft yarns are selected from the group of synthetic or natural materials consisting of carbon, nylon, rayon, polyester, fiberglass, cotton, glass, ceramic, aramid, and polyethylene.

47. The integrally woven three dimensional preform of claim 37, wherein a composite structure is formed from a process selected from the group consisting of resin transfer molding and chemical vapor filtration.

48. The composite structure of claim 47, wherein a matrix material is selected from the group consisting of epoxy, polyester, vinyl-ester, ceramic, and carbon.

49. A method of forming an integrally woven three dimensional preform according to claim 1, said method comprising the steps of:
 providing three or more woven fabrics;
 interweaving a plurality of yarns from a first woven fabric with a plurality of yarns from a second woven fabric, said first woven fabric foldable in relation to said second woven fabric;
 interweaving a plurality of yarns from said second woven fabric with a plurality of yarns from a third woven fabric;
 cutting said first woven fabric from a top surface of said second woven fabric;
 folding together a first portion of said first fabric formed on a first side of an interwoven region of said first and second fabrics with a first portion of said first fabric formed on a second side of the interwoven region of said first and second fabrics to form a stiffener in a first direction;
 folding a second portion of said first fabric to form a reinforcing member for a stiffener formed in a second direction;
 folding a first portion of said second and said third woven fabrics to form a stiffener in a second direction; and
 folding a second portion of said third foldable fabric to complete a panel portion of said preform.

50. The method of claim 49 wherein said preform is woven using a Jacquard loom.

51. The method of claim 49 wherein said preform is woven using a harness loom.

52. The method of claim 49, wherein the woven fabrics are woven with warp and weft yarns or fibers.

53. The method of claim 49 further comprising the steps of;
 interweaving a plurality of yarns in a plurality of independent regions between said first and said second fabrics;
 cutting said first woven fabric from a top surface of said second woven fabric in a plurality of regions;
 folding together a plurality of first portions on a plurality of first sides of a plurality of said interwoven regions of said first and second woven fabrics with a plurality of first portions on a plurality of second sides of a plurality of said interwoven regions of said first and second woven fabrics to from a plurality of stiffeners in a first direction;
 folding a plurality of second portions of said plurality of stiffeners to form a plurality of reinforcing members for a stiffener formed in a second direction;
 folding portions of said second and said third woven fabrics relative to said first woven fabric to provide a stiffener in a second direction; and
 folding a second portion of said third foldable fabric to complete a panel portion of said preform.

54. The method in claim 49 further comprising the steps of;
 providing a fourth woven fabric;
 interweaving a plurality of yarns between said third woven fabric and said fourth woven fabric, wherein said plurality of yarns are interwoven over a region between said third fabric and said fourth fabric to allow said fourth woven fabric to be foldable relative to said third woven fabric;
 cutting said fourth woven fabric to a top surface of said third woven fabric;
 folding together a first portion on a first side of said interwoven regions of said third and fourth woven fabrics with a first portion on a second side of the interwoven region of said third and fourth woven fabrics to form a stiffener in a first direction;
 folding a second portion of said stiffener to form a reinforcing member for a stiffener formed in a second direction;
 folding a first portion of said third woven fabric relative to said second woven fabric to provide a stiffener in a second direction; and
 folding a second portion of said third foldable fabric to complete a panel portion of said preform.

55. The method in claim 49, wherein a warp fiber pattern is any pattern selected from the group comprising ply-to-ply, orthogonal, and angle interlock.

56. The method in claim 49, wherein the interwoven yarns are warp yarns.

57. The method in claim 49, wherein the interwoven yarns are weft yarns.

58. The method in claim 49, wherein said warp and weft yarns are selected from the group of synthetic or natural materials comprising carbon, nylon, rayon, polyester, fiberglass, cotton, glass, ceramic, aramid, and polyethylene.

59. The method in claim 49, wherein a composite structure is formed from a process selected from the group comprising resin transfer molding and chemical vapor filtration.

60. The method in claim 49, wherein a matrix material is selected from the group comprising epoxy, polyester, vinylester, ceramic, and carbon.

* * * * *